(12) United States Patent
Busaba et al.

(10) Patent No.: US 8,495,341 B2
(45) Date of Patent: Jul. 23, 2013

(54) INSTRUCTION LENGTH BASED CRACKING FOR INSTRUCTION OF VARIABLE LENGTH STORAGE OPERANDS

(75) Inventors: Fadi Busaba, Poughkeepsie, NY (US); Brian Curran, Saugerties, NY (US); Bruce Giamei, Poughkeepsie, NY (US); Christian Jacobi, Poughkeepsie, NY (US); Wen Li, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 12/707,163

(22) Filed: Feb. 17, 2010

(65) Prior Publication Data

US 2011/0202747 A1      Aug. 18, 2011

(51) Int. Cl.
*G06F 9/30* (2006.01)
(52) U.S. Cl.
USPC ............................ 712/210; 712/204; 712/225
(58) Field of Classification Search
USPC .......................................... 712/204, 210, 225
See application file for complete search history.

(56) References Cited

U.S. PATENT DOCUMENTS

| | | | | |
|---|---|---|---|---|
| 3,654,448 A * | 4/1972 | Hitt | ................ | 714/17 |
| 4,135,242 A * | 1/1979 | Ward et al. | ................ | 712/245 |
| 4,604,684 A | 8/1986 | Epstein | | |
| 4,608,633 A * | 8/1986 | Boothroyd et al. | ................ | 711/214 |
| 4,654,781 A * | 3/1987 | Schwartz et al. | ................ | 711/219 |
| 4,853,840 A | 8/1989 | Shibuya | | |
| 4,858,104 A | 8/1989 | Matsuo et al. | | |
| 4,873,629 A | 10/1989 | Harris et al. | | |
| 4,933,847 A * | 6/1990 | Chau et al. | ................ | 712/236 |
| 5,073,855 A | 12/1991 | Staplin et al. | | |
| 5,150,468 A | 9/1992 | Staplin et al. | | |
| 5,168,571 A * | 12/1992 | Hoover et al. | ................ | 712/210 |
| 5,434,985 A | 7/1995 | Emma et al. | | |
| 5,442,762 A * | 8/1995 | Kato et al. | ................ | 712/208 |
| 5,500,947 A | 3/1996 | Uhler et al. | | |
| 5,574,933 A * | 11/1996 | Horst | ................ | 712/28 |

(Continued)

FOREIGN PATENT DOCUMENTS

| | | |
|---|---|---|
| EP | 378816 | 12/1989 |
| EP | 438961 A2 * | 7/1991 |

(Continued)

OTHER PUBLICATIONS

Michael Gschwind and Kemal Ebcioglu and Erik Altman and Sumedh Sathaye. Binary Translation and Architecture Convergence Issues for IBM System/390. In Preceedings of ICS-2000 Sante Fe, New Mexico, Aug. 8-10, 2000.

(Continued)

*Primary Examiner* — Aimee Li
(74) *Attorney, Agent, or Firm* — Fleit Gibbons Gutman Bongini & Bianco PL; Thomas Grzesik (57) ABSTRACT

A method, information processing system, and computer program product manage variable operand length instructions. At least one variable operand length instruction is received. The at least one variable operand length instruction is analyzed. A length of at least one operand in the variable operand length instruction is identified based on the analyzing. The at least one variable operand length instruction is organized into a set of unit of operations. The set of unit of operations are executed. The executing increases one or more performance metrics of the at least one variable operand length instruction.

20 Claims, 7 Drawing Sheets

U.S. PATENT DOCUMENTS

| | | | |
|---|---|---|---|
| 5,666,506 | A | 9/1997 | Hesson et al. |
| 5,694,565 | A | 12/1997 | Kahle et al. |
| 5,717,910 | A | 2/1998 | Henry |
| 5,742,805 | A | 4/1998 | Kulkarni et al. |
| 5,752,273 | A | 5/1998 | Nemirovsky et al. |
| 5,781,752 | A | 7/1998 | Moshovos et al. |
| 5,826,089 | A | 10/1998 | Ireton |
| 5,867,684 | A | 2/1999 | Kahle et al. |
| 5,909,567 | A | 6/1999 | Novak et al. |
| 5,953,241 | A * | 9/1999 | Hansen et al. ............... 708/501 |
| 6,134,646 | A | 10/2000 | Feiste et al. |
| 6,182,202 | B1 * | 1/2001 | Muthukkaruppan ......... 711/212 |
| 6,209,082 | B1 * | 3/2001 | Col et al. ...................... 712/225 |
| 6,219,742 | B1 | 4/2001 | Stanley |
| 6,336,183 | B1 | 1/2002 | Le et al. |
| 6,366,998 | B1 * | 4/2002 | Mohamed ....................... 712/17 |
| 6,654,869 | B1 | 11/2003 | Kahle et al. |
| 6,697,939 | B1 | 2/2004 | Kahle |
| 6,999,952 | B1 | 2/2006 | Pham |
| 6,999,985 | B2 * | 2/2006 | Symes et al. ................. 708/524 |
| 7,082,517 | B2 | 7/2006 | Busaba et al. |
| 7,085,917 | B2 | 8/2006 | Busaba et al. |
| 7,159,102 | B2 | 1/2007 | Irie et al. |
| 7,162,621 | B2 | 1/2007 | Kissell |
| 7,260,711 | B2 * | 8/2007 | Symes .......................... 712/300 |
| 7,269,715 | B2 | 9/2007 | Le et al. |
| 7,383,422 | B2 * | 6/2008 | Kageyama et al. ............. 712/24 |
| 7,546,445 | B2 * | 6/2009 | Tago et al. .................... 712/238 |
| 7,730,287 | B2 * | 6/2010 | Hansen et al. ................ 712/222 |
| 2002/0010847 | A1 * | 1/2002 | Abdallah et al. ............... 712/22 |
| 2002/0065860 | A1 * | 5/2002 | Grisenthwaite et al. ...... 708/207 |
| 2002/0152259 | A1 | 10/2002 | Trong et al. |
| 2005/0223292 | A1 | 10/2005 | Lee et al. |
| 2006/0053343 | A1 | 3/2006 | Hayem |
| 2008/0201560 | A1 * | 8/2008 | Kageyama et al. ........... 712/226 |
| 2009/0182984 | A1 * | 7/2009 | Greiner et al. ................ 712/205 |
| 2009/0210659 | A1 | 8/2009 | Carlough et al. |
| 2009/0240914 | A1 | 9/2009 | Malley et al. |
| 2009/0240919 | A1 | 9/2009 | Alexander et al. |

FOREIGN PATENT DOCUMENTS

| | | | |
|---|---|---|---|
| EP | 374830 | A3 | 3/1992 |
| JP | 10116191 | A * | 5/1998 |
| JP | 2000259408 | A | 9/2000 |
| JP | 2001229024 | A2 | 8/2001 |
| JP | 2004342102 | A2 | 12/2004 |

OTHER PUBLICATIONS

Abraham Ziv and Merav Aharoni and Sigal Asaf. Solving Range Constraints for Binary Floating Instructions. Haifa University. 2003. International Business Machines Research Labs. Haifa, Israel.

Fadi Busaba and Timothy Slegel and Steven Carlough and Christopher Krygowski and John G. Rell. The Design of the Fixed Point Unit for z990 Microprocessor. GLSVLSI' 04. 2004. Boston.

Gideon D, Intrater and Iian Y. Spikkinger. Performance Evaluation of a Decoded Instruction Cache for Variable Instruction Length Computers. IEEE. Oct. 2004.

Gang Quan and James P. Davis and Siddhaveerasharan Devarkal and Duncan A . Buell. High Level Synthesis for Large Bit Width Multipliers on FPGAS: A Case Study. Codes+ISSS' 05. 2005. New Jersey.

Jose Rizo Morente and Miguel Casas-Sanchez and C.J. Bleakley. Dynamic Current Modeling at the Instruction Level. ISLPED' 06. 2006. Tegemsee, Germany.

Michael J, Flynn. Instruction Sets and Their Implementations. IEEE.. EE Department, CSL. Stanford, CA. Dec. 27 to Dec. 29, 1990.

* cited by examiner

| AP | | | $D_1(L_1,B_1),D_2(L_2,B_2)$ | | | [SS] |
|---|---|---|---|---|---|---|
| 'FA' | $L_1$ | $L_2$ | $B_1$ | $D_1$ | $B_2$ | $D_2$ |
| 0 | 8 | 12 | 16 | 20 | 32 | 36 | 47 |

| MVC | | $D_1(L,B_1),D_2(B_2)$ | | | [SS] |
|---|---|---|---|---|---|
| 'D2' | L | $B_1$ | $D_1$ | $B_2$ | $D_2$ |
| 0 | 8 | 16 | 20 | 32 | 36 | 47 |

| XC | | $D_1(L,B_1),D_2(B_2)$ | | | [SS] |
|---|---|---|---|---|---|
| 'D7' | L | $B_1$ | $D_1$ | $B_2$ | $D_2$ |
| 0 | 8 | 16 | 20 | 32 | 36 | 47 |

FIG. 5

MVC INSTRUCTION

LENGTH = 0 TO 7

FIG. 6

LENGTH = 8 TO 15

FIG. 7

XC INSTRUCTION

FIG. 8

OC/NC INSTRUCTIONS

```
        ┌─────────────────────────────┐
        │ Crack to 2 Uops.            │
  902 ──┤─ Uop1: sGR ← Op2            │
  904 ──┤─ Uop2: Op1 ← sGR op Op1     │
        └─────────────────────────────┘
```

FIG. 9

CLC INSTRUCTION

```
        ┌─────────────────────────────────┐
        │ Crack to 2 Uops.                │
 1002 ──┤─ Uop1: sGR ← Op2          LDQ   │
 1004 ──┤─ Uop2: CC  ← sGR op Op1   LDQ   │
        └─────────────────────────────────┘
```

FIG. 10

AP/SP/CP/ZAP/MP/DP INSTRUCTIONS

```
Len1 and Len2 =< (4 Uops)
1102 — Uop1: sFPR1 ← Op1    LDQ STQ* STB*
1104 — Uop2: sFPR3 ← Op2    LDQ
1106 — Uop3: sFPR1 ← sFPR1 op sFPR3
1108 — Uop4*: store ← sFPR1
```
Len1, Len2 =<7

FIG. 11

```
Len1 > 7 and Len2 =< 7 (6 Uops)
1202 — Uop1: sFPR1 ← Op1    LDQ STQ* STB*
1204 — Uop2: sFPR2 ← Op1+s       STQ* STB*
1206 — Uop3: sFPR3 ← Op2    LDQ
1208 — Uop4: sFPR1 & sFPR2 ← (sFPR1&sFPR2) op sFPR3
1210 — Uop5*: store    ← sFPR1
1212 — Uop6*: store+8 ← sFPR2
```
Len1 > 7, Len2 =<7

FIG. 12

```
Len1 =< 7 and Len2 > 7 (5 Uops)
1302 — Uop1: sFPR1 ← Op1    LDQ STQ* STB*
1304 — Uop2: sFPR3 ← Op2    LDQ
1306 — Uop3: sFPR4 ← Op2+8
1308 — Uop4: sFPR1 ← sFPR1 op (sFPR3 & sFPR4)
1310 — Uop5: store* ← sFPR1
```
Len1 =< 7, Len2 >7

FIG. 13

```
Len1 > 7 and Len2 =< 7 (7 Uops)
1402 — Uop1: sFPR1 ← Op1    LDQ STQ* STB*
1404 — Uop2: sFPR2 ← Op1+8       STQ* STB*
1406 — Uop3: sFPR3 ← Op2    LDQ
1408 — Uop4: sFPR4 ← Op2+8
1410 — Uop5 : sFPR1 & sFPR2 ← (sFPR1&sFPR2) op (sFPR3&sFPR4)
1412 — Uop6*: store      ← sFPR1*
1414 — Uop7*: store+8 ← sFPR2*
```
Len1, Len2 >7

INSTRUCTION LENGTH BASED CRACKING FOR INSTRUCTION OF VARIABLE LENGTH STORAGE OPERANDS

FIELD OF THE INVENTION

The present invention generally relates to microprocessors, and more particularly relates to managing variable length instructions.

BACKGROUND OF THE INVENTION

As computer system designers seek to continually improve processor performance, it is beneficial to develop approaches that increase IPC (Instruction per cycle) through optimizing the rate of instruction processing and increasing the throughput of data. This is especially true for instructions with variable operands length such as variable operand length s storage-to-storage instructions (or SS ops). However, conventional systems generally experience large overhead with respect to the startup sequences of these types of instructions, which reduces the system performance. For example, some conventional systems execute SS ops within a load storage unit (LSU) using a sequence (which occupies both LSU pipelines for the duration of the op) similar to the following. In first LSU pipeline a destination operand starting address pretest is performed while in a second LSU pipeline a source operand starting address store pretest is performed. Then in the first LSU pipeline a destination operand ending address store pretest is performed while in the second LSU pipeline a source operand ending address store pretest is performed. Subsequently in both pipelines operand data streaming (1 to 256 bytes) is performed.

With respect to an SS op instruction such as an MVC (move character) type instruction two double-words of source operand are read from the D-cache each cycle and written into the store buffer. During data streaming phase for arithmetic SS instructions, such as an O character (OC) instruction, N character (NC) instruction, exclusive OR character (XC) instruction, etc., one double-word of the source operand and one double-word of the destination operand are read from the D-cache each cycle, the specified arithmetic operation is performed and the result is written into the store buffer. The above conventional processing of variable operands length instructions generally results in a large overhead with respect to the startup sequence (including store pretests) for "short" sequences. This overhead is generally much larger than the actual operand streaming. Previously, guidelines have been established for compilers and software to use separate load, store (and arithmetic) instructions for short sequences. Unfortunately, the definition of short varies from machine to machine.

SUMMARY OF THE INVENTION

In one embodiment, a method for managing variable operand length instructions is disclosed. The method comprises receiving at least one variable operand length instruction. The at least one variable operand length instruction is analyzed. A length of at least one operand in the variable operand length instruction is identified based on the analyzing. The at least one variable operand length instruction is organized into a set of unit of operations that are executable in parallel based on the length that has been identified. The set of unit of operations are executed. The executing increases one or more performance metrics of the at least one variable operand length instruction.

In another embodiment, an information processing system for managing variable operand length instructions is disclosed. The information processing system comprises a memory and a processor communicatively coupled to memory. The processor comprises a cracking unit that is configured to perform a method comprising receiving at least one variable operand length instruction. The at least one variable operand length instruction is analyzed. A length of at least one operand in the variable operand length instruction is identified based on the analyzing. The at least one variable operand length instruction is organized into a set of unit of operations that are executable in parallel based on the length that has been identified. An execution unit comprised within the processor is configured to perform a method comprising executing the set of unit of operations. The executing increases one or more performance metrics of the at least one variable operand length instruction.

In a further embodiment, a computer program product for managing variable operand length instructions is disclosed. The computer program product comprises a storage medium readable by a processing circuit and storing instructions for execution by the processing circuit for performing a method. The method comprises receiving at least one variable operand length instruction is received. The at least one variable operand length instruction is analyzed. A length of at least one operand in the variable operand length instruction is identified based on the analyzing. The at least one variable operand length instruction is organized into a set of unit of operations that are executable in parallel based on the length that has been identified. The set of unit of operations are executed. The executing increases one or more performance metrics of the at least one variable operand length instruction.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
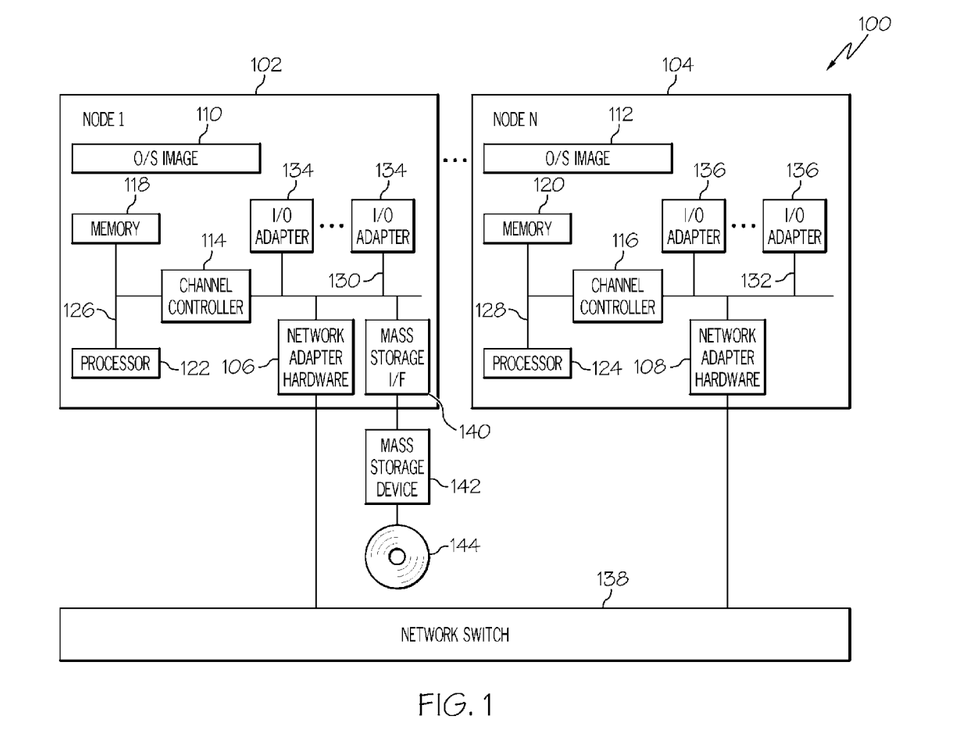
FIG. 1 illustrates one example of an operating environment according to one embodiment of the present invention.

FIG. 1 shows an exemplary operating environment applicable to various embodiments of the present invention. In particular, FIG. 1 shows a parallel-distributed processing system in which one embodiment of the present invention is implemented. In this embodiment, the parallel-distributed processing system 100 operates in an SMP computing environment. In an SMP computing environment, parallel applications can have several tasks (processes) that execute on the various processors on the same processing node. The parallel-distributed processing system 100 executes on a plurality of processing nodes 102 and 104 coupled to one another node via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 130 and 132 couples I/O adapters 134 and 136 and communication adapter 106 and 108. Although only one processor 122 and 124 is shown in each processing node 102 and 104 for simplicity, each processing node 102 and 104 can have more than one processor. The communication adapters are linked together via a network switch 138.

Also, one or more of the nodes 102, 104 comprises mass storage interface 140. The mass storage interface 140 is used to connect mass storage devices 142 to the node 102. One specific type of data storage device is a computer readable medium such as a Compact Disc ("CD") drive, which may be used to store data to and read data from a CD 144 or DVD. Another type of data storage device is a hard disk configured to support, for example, JFS type file system operations. In some embodiments, the various processing nodes 102 and 104 are able to be part of a processing cluster. The present invention is not limited to an SMP environment. Other architectures are applicable as well, and further embodiments of the present invention can also operate within a single system.

Processor Core

Figure 2:
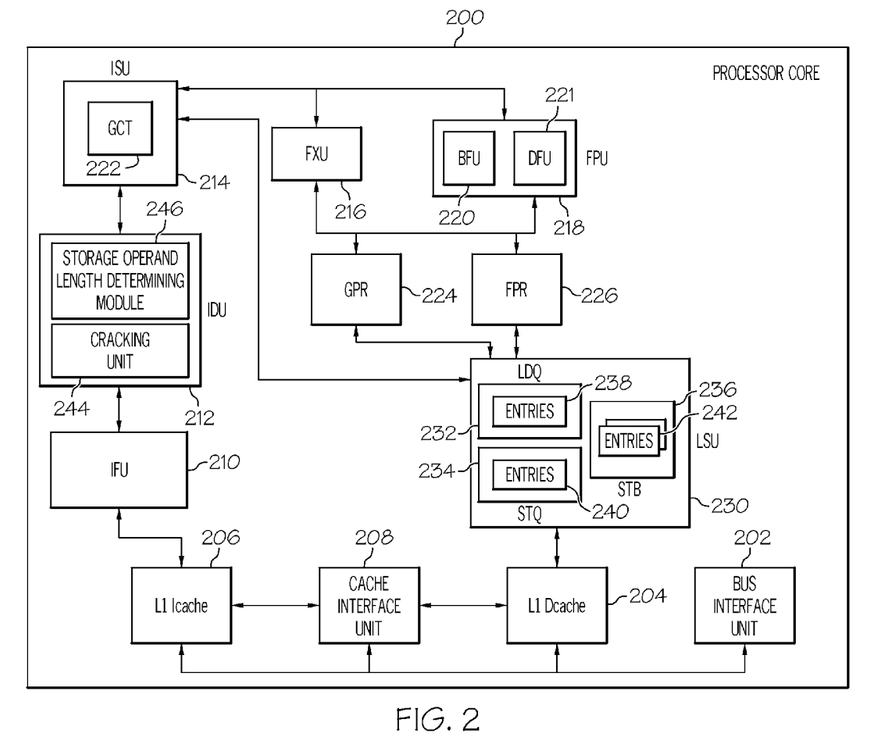
FIG. 2 illustrates a detailed view of a processing core according to one embodiment of the present invention.

According to one embodiment, FIG. 2 illustrates one example of a processor core 200 within a processor 122, 124 for performing workaround operations based on active events in the processor pipeline. It should be noted that the configuration shown in FIG. 2 is only one example applicable to the presently claimed invention. In particular, FIG. 2 shows a processing core 200. The processor core 200, in one embodiment, comprises a bus interface unit 202 that couples the processor core 200 to other processors and peripherals. The bus interface unit 202 also connects L1 Dcache 204, which reads and stores data values, L1 Icache 206, which reads program instructions, and a cache interface unit 208 to external memory, processor, and other devices.

The L1 Icache 206 provides loading of instruction streams in conjunction with an instruction fetch unit IFU 210, which prefetches instructions and may include speculative loading and branch prediction capabilities. These fetched instruction codes are decoded by an IDU 212 into instruction processing data. Once decoded, the instructions are dispatched to an instruction sequencer unit (ISU) 214. The ISU 214 controls sequencing of instructions issued to various execution units such as one or more fixed point units (FXU) 216 for executing general operations and one or more floating point units (FPU) 218 for executing floating point operations. The floating point unit(s) 218 can be a binary point floating unit 220, a decimal point floating unit 221, and/or the like. It should be noted that the FUX(s) 216, in one embodiment, comprises multiple FXU pipelines, which are copies of each other. The ISU 214 is also coupled to one or more load/store units (LSU) 230 via one or more LSU pipelines. These multiple LSU pipelines are treated as execution units for performing loads and stores and address generation for branches.

A set of global completion tables (GCT) 222 residing within the ISU 214 track the instructions issued by ISU 214 via tags until the particular execution unit targeted by the instruction indicates the instructions have completed execution. The FXU 216 and FPU 218 are coupled to various resources such as general-purpose registers (GPR) 224 and floating point registers (FPR) 226. The GPR 224 and FPR 226 provide data value storage for data values loaded and stored from the L1 Dcache 204 by a load store unit (LSU) 230.

In addition, to the configuration of the processor core 200 discussed above, in one embodiment, the LSU 230 comprises a load queue (LDQ) 232, a store queue (STQ) 234, and a store buffer (STB) 236. The LDQ 232 and the STQ 234 each comprise entries 238, 240, respectively, that track additional information associated with outstanding load and store instructions. For example, the entries 238 of the LDQ 232 comprise the starting address and ending address of a corresponding load instruction. The entries 240 of the STQ 234 comprise the starting address and the ending address of corresponding store data. The STB 236 comprises entries 242 where a corresponding store instruction saves its data prior to writing the data back the cache 204.

In one embodiment, the IDU 212 comprises a cracking unit 244. The cracking unit 244 organizes/breaks a complex instruction into simpler units. Stated differently, the cracking unit 244 organizes an instruction such as an STM instruction into a set of units of operation (Uops) that can be handled in parallel paths, but are not required to be handled in parallel. The cracking unit 244 is discussed in greater detail below. In one embodiment, the IDU 212 also comprises an instruction operands length determining module 246 that determines the operand(s) length of the instruction. This length is used to crack a variable operands length instruction into a given number of Uops for optimizing the rate of instruction processing and increasing the throughput of data reduce OSC (operand store compare) hazards.

Instruction Length Based Cracking

As discussed above, conventional methods for managing variable operands length instructions, especially SS ops with "short" sequences, e.g., SS ops with operands lengths less than or equal to 16 bytes, experience large overhead of the startup sequence and diminished performance. Therefore, in addition to the general processing mechanisms discussed above with respect to FIG. 1, one or more of the following embodiments crack variable operands length instructions, such as SS-logical instructions (e.g., MVC, XC, NC, OC, CLC) and SS-decimal instructions (e.g., MP, DP, SP, AP, ZAP, CP, SRP), based on opcode and the length of the operands. Cracking improves the issue bandwidth, store-load data bypassing, and removes hardware complexity from execution units, among other things. Cracking long running instruction based on opcode and length(s) fields to many Uops allows store-load bypassing from and into these cracked instructions; removes the execution bottle neck for long running ops, and simplifies the load queue, store queue and store buffer assignment.

Cracking variable operands length instructions, such as SS-logical instructions (e.g., MVC, XC, NC, OC, CLC) and SS-decimal instructions (e.g., MP, DP, SP, AP, ZAP, CP, SRP) based on opcode and the length of the operands allows the instruction to be cracked into simpler Uops that can be issued and executed in parallel and that can fit mapper resources. Store Uops are uniquely identified and a store queue entry is assigned for each one so store data can be bypassed to longer loads. Also, load Uops are uniquely identified so a store from an older instruction can be bypassed into the load Uop.

In one embodiment, the IFU 210 fetches an instruction from the I-cache 206 and sends the instruction into the pipeline for decoding by the IDU 212. The IDU 212 decodes the instruction and determines that the instruction has variable operands length. The IDU 212 analyzes the instruction to determine the opcode and the operands length determining module 246 determines the length(s) of operands. The cracking unit 244 then cracks this instruction based on the opcode and the length(s).

Figure 3:
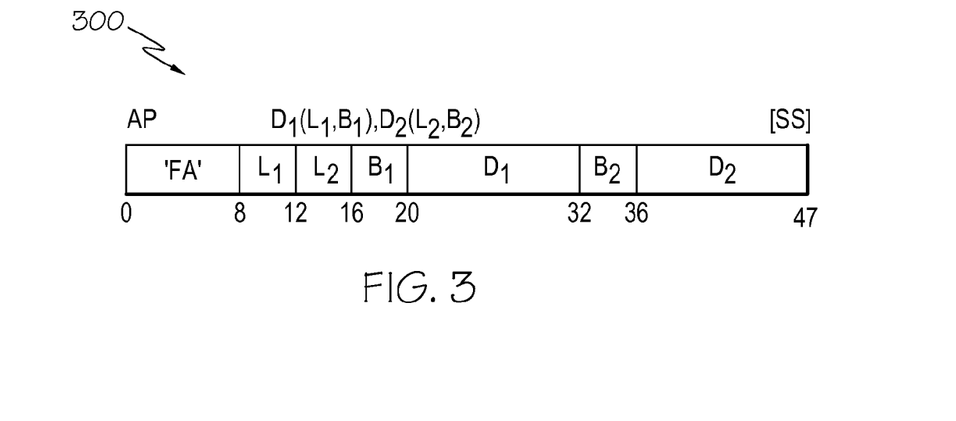
FIGS. 3-5 show various examples of a variable operands length instruction.
Figure 4:
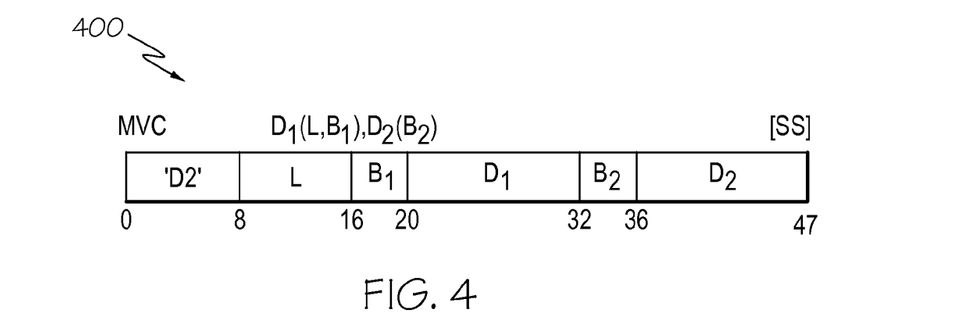
Figure 5:
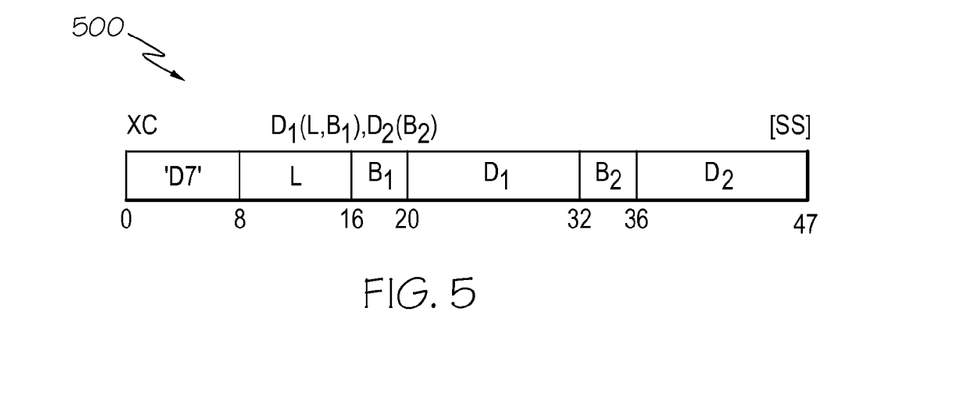

FIGS. 3-5 illustrate a few examples of variable operands lengths instructions. In particular, FIG. 3 illustrates an Add Decimal (AP) instruction format, FIG. 4 illustrates a Move Character (MVC) instruction format, and FIG. 5 illustrates an Exclusive OR Character (XC) instruction format. It should be noted that other instructions such as SP, CP, ZAP, MP, DP, etc. have the same format as the Add Decimal (AP) format of FIG. 3. Also, instructions such as CLC, OC, NC, etc. have the same format as the MVC and XC format of FIGS. 4 and 5.

As can be seen from FIG. 3, the AP instruction format 300 comprises a set of instruction text bits 0:7. These instruction text bits are the instruction opcode. Instruction text bits 8:11 (L1) comprise the length of the first operand. Value ranges from "0000" (1 byte) to "1111" (16 bytes). Instruction text bits 12:15 (L2) comprise the length of the second operand. Value ranges from "0000" (1 byte) to "1111" (16 bytes). Instruction text bits 16:19 (B1) comprise the base register number for the first operand. Instruction text bits 20:31 (D1) comprise the displacement value for the first operand. Instruction text bits 32:35 (B2) comprise the base register number for the second operand. Instruction text bits 36:47 (D2) comprise the displacement value for the second operand. The first operand data is at memory location (GPR-B1+D1) to (GPR-B1+D1+L1) for a total of (L1+1) bytes. The second operand data is at memory location (GPR-B2+D2) to (GPR-B2+D2+L2) for a total of (L2+1) bytes. This instruction adds (decimal addition) the first operand to the second operand and stores result back at the first operand location.

As can be seen from FIGS. 4 and 5, the MVC and XC instruction formats 400, 500 comprise a set of instruction text bits 0:7. These instruction text bits are the instruction opcode. Instruction text bits 8:15 equal the operand lengths (L), e.g., 1-256 bytes, in memory. Instruction text bits 16:19 (B1) comprise the base register number for the first operand. Instruction text bits 20:31 (D1) comprise the displacement value for the first operand. Instruction text bits 32:35 (B2) comprise the base register number for the second operand. Instruction text bits 36:47 (D2) comprise the displacement value for the second operand. The first operand data is at memory location (GPR-B1+D1) to (GPR-B1+D1+L) for a total of L+1 bytes. The second operand data is at memory location (GPR-21+D2) to (GPR-B2+D2+L) for a total of L+1 bytes. The MVC instruction moves the second operand data to the first operand from left (staring address) to right byte at a time. The XC instruction performs the exclusive logic OR function between the two operands and stores the result back at first operand. Bytes are processed left (byte at the starting address) to right.

Once the IDU 212 receives the instruction from the IFU 210, the IDU 212 decodes the instruction and identifies the opcode as indicated by bits 0 to 7. The IDU 212, via the instruction operands length determination module 246, also identifies the length of the operands as indicated by bits 8-15. The cracking unit 244 breaks/organizes the instruction into a group of Uops based on the identified opcode and length. These opcodes are then sent to the ISU 214 for issuing to the execution units. The number of Uops depends on the instruction type as indicated by the opcode and the length of the instruction. The cracking is performed during decode and instruction grouping cycles. Each Uop has its own logical register assignments, Condition Code read/write conditions, load queue, store queue, and store buffer allocation and usage, etc.

Figure 6:
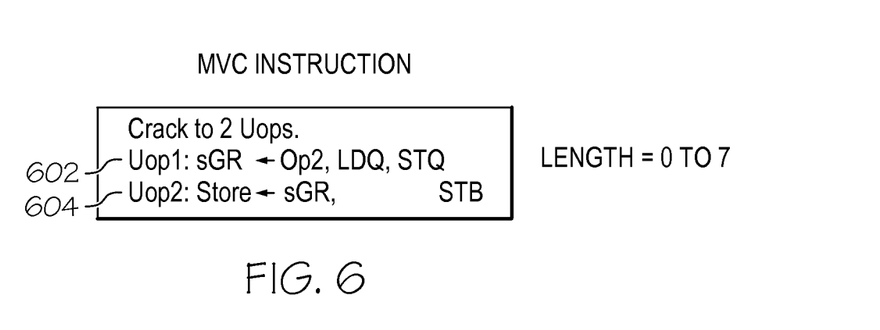
FIGS. 6-14 show various examples of Uops created based on the size of one or more operands in variable operand length instructions according to one or more embodiments of the present invention.
Figure 7:
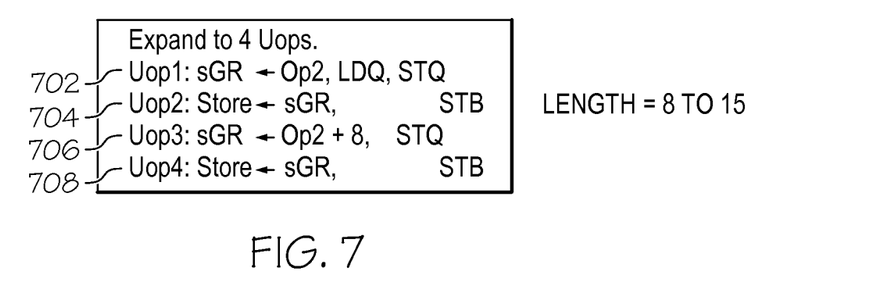

FIGS. 6-14 show various examples how the cracking unit 244 cracks variable operands lengths instructions such as SS-logical and SS-decimal instructions into multiple Uops. FIGS. 6-7 show an example of Uops for an MVC instruction that has operands length value ranging from 0 to 15 (1 to 16 bytes). The MVC instruction moves a specified number of bytes from op1 to op2. In particular, FIG. 6 shows the Uops for an MVC instruction that is 1 to 8 bytes (L value is 0 to 7) in operands length and FIG. 7 shows the Uops when the MVC instruction is 9 to 16 bytes (L value is 8 to 15) in operands length. It should be noted that various embodiments of the present invention are not limited to only cracking an MVC instruction (or any other instruction) with operands length from 0 to 15 (1 to 16 bytes), as instructions with greater operands lengths can also be cracked as well.

As can be seen from FIG. 6, the cracking unit 244 has broken the MVC instruction into a set of Uops ranging from Uop1 to Uop2 when the operand length of the MVC instruction is 0 to 7 (1 to 8 bytes). Once the cracking unit 244 has formed the Uops, the IDU 244 sends the Uops to the ISU 214. Uop1 602 performs a load from op2, e.g., reads 1 to 8 bytes from op2. Therefore, an LDQ entry is allocated for op2, a STQ entry is allocated to Uop1 602 (STQ entry could have allocated with the dispatch of Uop2 604), and a STB is allocated for op1 data to be saved into. These allocations are performed in order at dispatch time. Uop1 602 fetches (loads) 1 to 8 bytes of op2 from memory and places this data into a scratch GR. Uop2 604, in this embodiment, is a dual issue Uop. For example, the first issue is an LSU issue, where Uop2 604 calculates the storage addresses (op1 to op1+L) and performs pretesting to check for any potential exception related to this storage access at this particular address. The second issue is a FXU issue where Uop2 604 reads the data from the scratch GR and sends the data to the STB.

FIG. 7 show that the cracking unit 244 has broken the MVC instruction into a set of Uops ranging from Uop 1 to Uop4 (2 loads followed by 2 stores) when the operand length of the MVC instruction is 8 to 15(9 to 16 bytes). Once the cracking unit 244 has formed the Uops, the IDU 244 sends the Uops to the ISU 214. An LDQ entry is allocated for op2, a STQ entry is allocated to Uop1 702 (STQ entry could have allocated with the dispatch of Uop2 704), and a STB is allocated for op1 data to be saved into. These allocations are performed in order at dispatch time. Uop1 702 loads 8 bytes of op2 (op2 to op2+7) from memory and places this data into a scratch GR. Uop2 704, in this embodiment, is a dual issue Uop. For example, the first issue is an LSU issue, where Uop2 704 calculates the storage address (op1 to op1+7) and performs pretesting to check for any potential exception related to this storage access at this particular address. The second issue is a FXU issue where Uop2 704 reads the data from placed in the scratch GR by Upo1 and sends the data to the STB.

Uop3 706 fetches the remaining op2 data (op2+8 to op2+L) from memory, i.e., the next potential 8 bytes after the data loaded by Uop1, and places this data into a scratch GR. Uop4 708, in this embodiment, is a dual issue Uop. For example, the first issue is an LSU issue, where Uop4 708 calculates the storage addresses where the data is going to be stored (op1+8 to op1+L) and performs pretesting to check for any potential exception related to this storage access at this particular address. The second issue is a FXU issue where Uop4 708 reads the data placed in the scratch GR by Upo3 and sends the data to the STB. It should be noted that if the operands length of the MVC instruction is greater than 16 bytes (L is greater than 16) the MVC instruction is issued to the LSU 230 as a sequenced op with an allocated LDQ and STQ and the LSU cannot execute any other instructions until the MVC instruction has completed.

Figure 8:
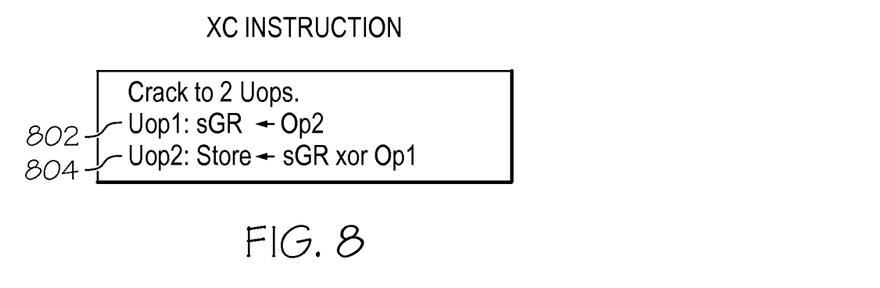

FIG. 8 shows the Uops for an XC instruction. As can be seen from FIG. 8, the cracking unit 244 has broken the XC instruction into a set of Uops ranging from Uop1 to Uop2 when the operands lengths of the XC instruction ranges from 0 to 7 (1 to 8 bytes). Once the cracking unit 244 has formed the Uops, the IDU 244 sends the Uops to the ISU 214. There is an LDQ entry, an STQ and STB entry allocated for op1, and an LDQ entry is allocated for op2. Uop1 802 loads 1 to 8 bytes of op2 data from memory and places this data into a scratch GR. Uop2 804, in this embodiment, is a dual issue Uop. For example, the first issue is an LSU issue, where Uop2 804 calculates the storage address for fetching up to 8 bytes from op1 and performs pretesting to check for any potential exception related to this storage access at this particular address. The second issue is a FXU issue where Uop2 804 brings the fetched data from op1 to the FXU 216. The FXU 216 performs an Xor operation between the op2 data in the scratch GR and the op1 data bytes fetched by Uop2. The result of the Xor operation is sent back to the LSU for storing in the STB, and the condition code is set based on the result value. It should be noted that if the operands lengths of the XC instruction is greater than 8 bytes (L is greater than 8) the XC instruction is issued to the LSU 230 as a sequenced op with an two allocated LDQs, one allocated STQ, and one allocated STB and the LSU cannot execute any other instructions until the XC instruction has completed.

Figure 9:
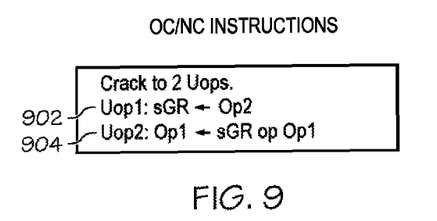

FIG. 9 shows the Uops for OC/NC instructions. As can be seen from FIG. 9, the cracking unit 244 has broken the OC/NC instruction into a set of Uops ranging from Uop 1 to Uop2 when the operands lengths of the OC/NC instruction is 0 to 7 (1 to 8 bytes). Once the cracking unit 244 has formed the Uops, the IDU 244 sends the Uops to the ISU 214. There is an LDQ entry, an STQ and STB entry allocated for op1, and an LDQ entry is allocated for op2. Uop1 902 loads 1 to 8 bytes of data from op2 and places this data in a scratch GR. Uop2 904, in this embodiment, is a dual issue Uop. For example, the first issue is an LSU issue, where Uop2 904 calculates the storage address for fetching up to 8 bytes from op1 and performs pretesting to check for any potential exception related to this storage access at this particular address. The second issue is a FXU issue where Uop2 904 brings the fetched data from op1 to the FXU 216.

The FXU 216 performs an ORing or an ANDing operation between the op2 data in the scratch GR and the op1 data fetched by Uop2. The result of the ORing or ANDing operation is sent back to LSU 230 for storing in the STB, and the condition code is set based on the result value. It should be noted that if the length of the OC/NC instruction is not equal to 0 to 7, the instruction is issued to the LSU 230 as a sequenced op with an allocated STQ (not needed if an exact overlap is occurring), two allocated LDQs, and one allocated STB and the LSU cannot execute any other instructions until the XC instruction has completed.

Figure 10:
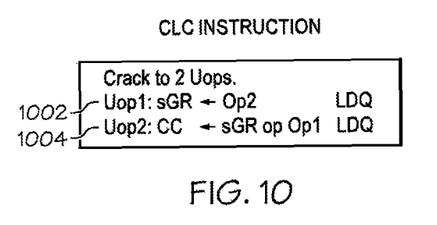
Figure 11:
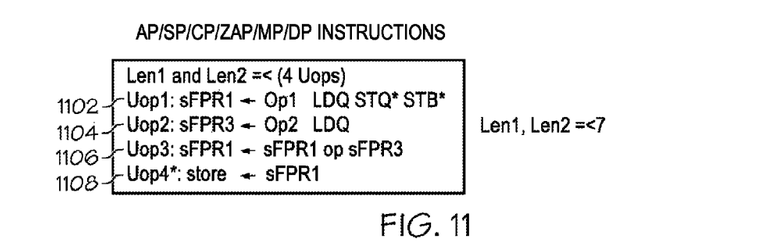

FIG. 10 shows the Uops for a CLC instruction, where two strings in memory are being compared and a condition code is being set. As can be seen from FIG. 10, the cracking unit 244 has broken the CLC instruction into a set of Uops ranging from Uop1 to Uop2 when the operands lengths of the CLC instruction is between 0 to 7, the instruction is not in slow mode. Once the cracking unit 244 has formed the Uops, the IDU 244 sends the Uops to the ISU 214. There is an LDQ entry allocated for op1, and another LDQ entry is allocated for op2. Uop1 1002 loads 1 to 8 bytes of data from op2 and places this data in a scratch GR. Uop2 1004, in this embodiment, is a dual issue Uop. For example, the first issue is an LSU issue, where Uop2 1004 calculates the storage address for fetching up to 8 bytes from op1 and performs pretesting to check for any potential exception related to this storage access at this particular address. The second issue is a FXU issue where Uop2 1004 brings the fetched data from op1 to the FXU 216.

The FXU 216 compares the op2 data in the scratch GR and the op1 data fetched by Uop2 and sets the condition code. It should be noted that if the length of the CLC instruction is not equal to 0 to 7, the instruction is issued to the LSU 230 as a sequenced op with two allocated LDQs and the LSU cannot execute any other instructions until the XC instruction has completed.

FIGS. 11-14 show examples of Uops SS-decimal instructions (e.g., decimal add AP, decimal subtract SP, decimal compare CP, decimal multiply MP, decimal divide DP, and decimal zero and add ZAP), where the operands have a variable length that are not required to be the same. The IDU 214, via the instruction length determining module 246, analyzes the instruction to determine the lengths of both operands and the cracking unit 244 cracks the instruction accordingly. As can be seen from FIG. 11, the cracking unit 244 has broken the instruction into a set of Uops ranging from Uop1 to Uop4 when the length of op1 and the length of op2 are less than or equal to 7 (i.e. both operands lengths are 8 bytes or less). An LDQ, STQ, and STB are allocated to Uop1 1102. It should be noted that if this is a CP instruction, the STQ and the STB are not required. Uop1 1102 loads 1 to 8 bytes from op1 and stores this data in a first scratch FPR. Uop2 1104 has an allocated LDQ and reads 1 to 8 bytes of data from op2. Uop2 1104 stores this data in a second scratch FPR. Uop3 1106 is a DFU executed instruction that adds, subtracts, or compares the data in the first scratch FPR with the data in the second FPR and places this result back into the first FPR. Uop4 1108 sends the result of the Uop3 1106 operation from the first scratch FPR to the LSU 230 for storage in the STB.

Figure 12:
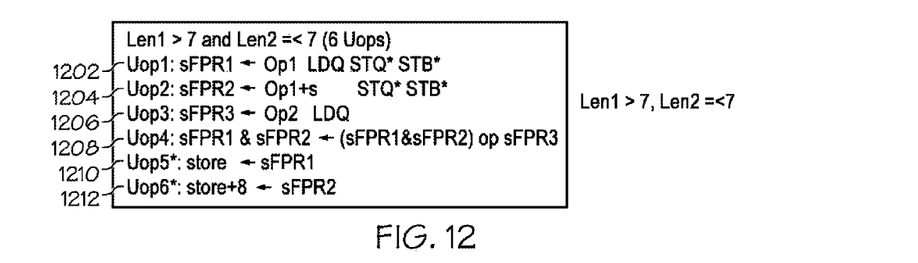

FIG. 12 shows the cracking unit 244 has broken the instruction into a set of Uops ranging from Uop1 to Uop6 when the length of op1 is greater than 7 (op1 length is larger than 8 bytes) and the length of op2 is less than or equal to 7 (operand 2 length is 8 bytes or less). An LDQ, STQ, and STB are allocated to Uop1 1102. It should be noted that if this is a CP instruction, the STQ and the STB are not required. Uop1 1202 loads 1 to 8 bytes (=op1 length of bytes minus 8 bytes) from op1 and stores this data in a first scratch FPR. Uop2 1204 is allocated an STQ and an STB (which are not required is a CP instruction) and loads the next potential 8 bytes of data from op1 after the bytes loaded by Uop1 1202. Uop2 1204 stores this data in a second scratch FPR.

Uop3 1206 has an allocated LDQ and reads 1 to 8 bytes of data from op2. Uop3 1206 stores this data in a third scratch FPR. Uop4 1208 is a DFU executed instruction that adds, subtracts, or compares the data in the first scratch FPR and the second scratch FPR with the data in the third FPR and places this result back into the first and second FPRs. Uop5 1210 sends the result of the Uop5 1208 operation from the first scratch FPR to the LSU 230 for storage in the STB. Uop6 1212 sends the result (store+8) of the Uop4 128 operation from the second scratch FPR to the LSU 230 for storage in the STB. It should be noted that if the instruction is a CP instruction Uop5 and Uop6 are not required.

Figure 13:
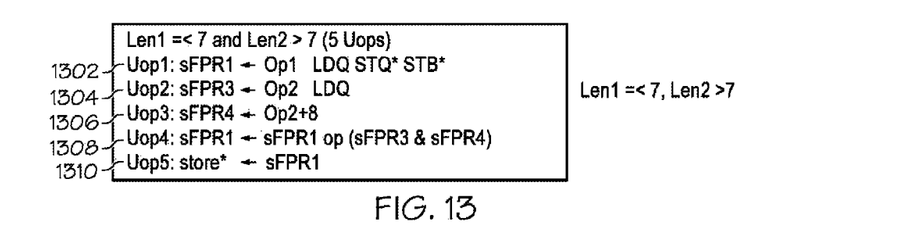

FIG. 13 shows the cracking unit 244 has broken the instruction into a set of Uops ranging from Uop1 to Uop5 when the length of op1 is less than or equal to 7 (8 bytes or less) and the length of op2 greater than 7 (9 to 16 bytes). An LDQ, STQ, and STB are allocated to Uop1 1302. It should be noted that if this is a CP instruction, the STQ and the STB are not required. Uop1 1302 loads 1 to 8 bytes from op1 and stores this data in a first scratch FPR. Since op2 is greater than 8 bytes two Uops are needed to store its data. Therefore, Uop2 1304 is allocated an LDQ and loads 1 to 8 bytes (=op2 length of bytes minus 8 bytes) of data from op2. Uop2 1304 stores this data in a second scratch FPR. Uop3 1306 reads the remaining 8 bytes from op2 and stores this data into a third scratch FPR.

Uop4 1308 is a DFU executed instruction that adds, subtracts, or compares the data in the first scratch FPR with the data in second scratch FPR and in the third FPR and places this result back into the first FPR. Uop5 1310 sends the result of the Uop4 1308 operation from the first scratch FPR to the LSU 230 for storage in the STB. It should be noted that if the instruction is a CP instruction Uop5 is not required.

Figure 14:
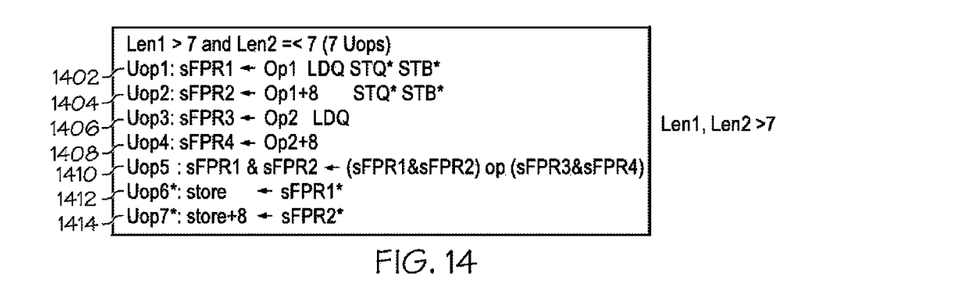

FIG. 14 shows the cracking unit 244 has broken the instruction into a set of Uops ranging from Uop1 to Uop7 when the length of op1 and the length of op2 are greater than 7 (9 to 16 bytes). An LDQ, STQ, and STB are allocated to Uop1 1402. It should be noted that if this is a CP instruction, the STQ and the STB are not required. Since op1 is greater than 8 bytes two Uops are needed to store its data. Uop1 1402 loads 1 to 8 bytes (op1 length in bytes minus 8 bytes) from op1 and stores this data in a first scratch FPR. Uop2 1404 loads the remaining 8 bytes of op1 into a second scratch FPR. Since op2 is greater than 8 bytes two Uops are needed to store its data. Therefore, Uop3 1406 is allocated an LDQ and loads 1 to 8 bytes (op2 length in bytes minus 8 bytes) of data from op2 and stores this data in a third scratch FPR. Uop4 1408 reads the remaining 8 bytes from op2 and stores this data into a fourth scratch FPR.

Uop5 1410 is a DFU executed instruction that adds, subtracts, or compares the data in the first and second scratch FPRs with the data in third and fourth scratch FPRs places this result back into the first FPR and second FPR, respectively. Uop6 1412 sends 1 to 8 bytes (op1 length in bytes minus 8 bytes) of the result of the Uop5 1410 operation from the first scratch FPR to the LSU 230 for storage in the STB. Uop7 1414 sends the remaining 8 bytes of the result of the Uop5 1410 operation from the second scratch FPR to the LSU 230 for storage in the STB. It should be noted that if the instruction is a CP instruction Uop6 and Uop7 are not required.

Operational Flow Diagram

Figure 15:
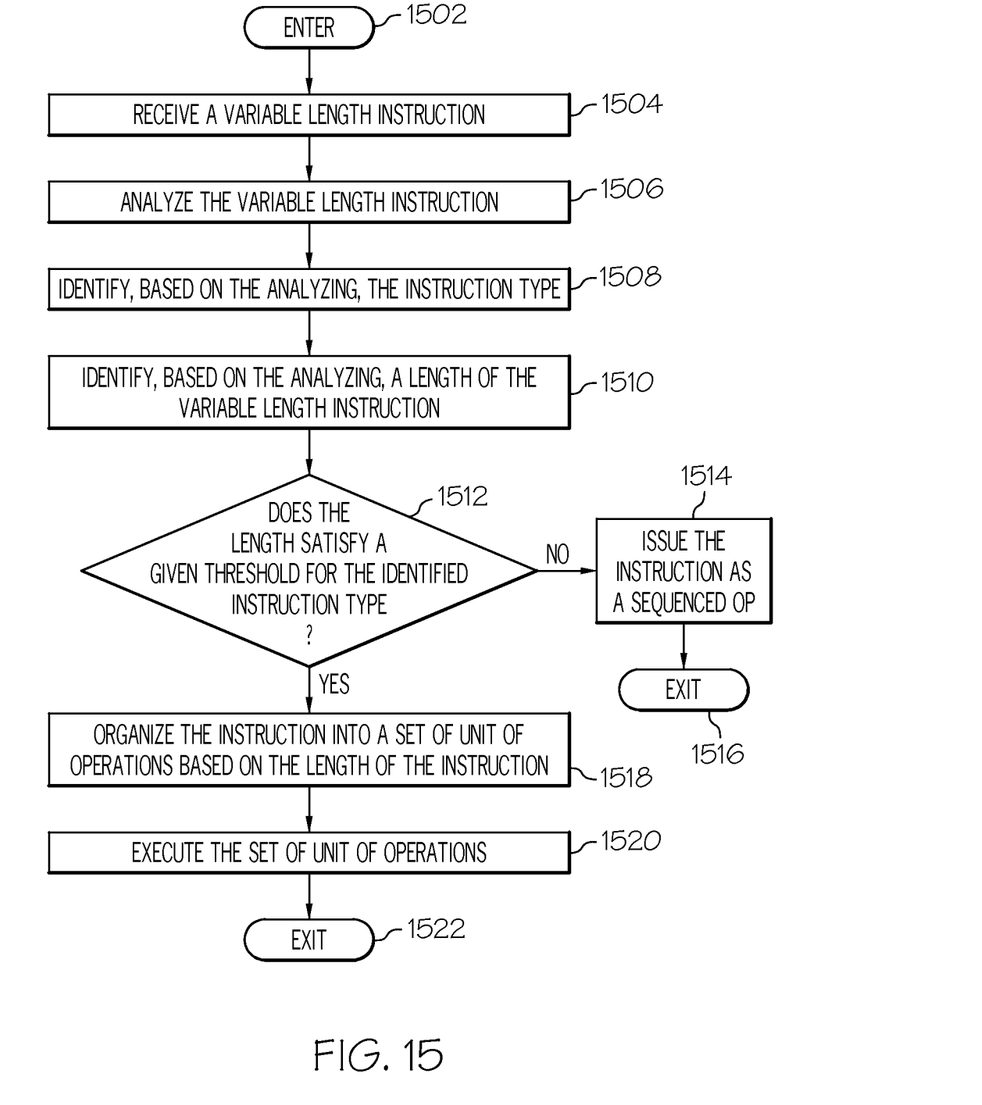
FIG. 15 is an operational flow diagram illustrating one examples of cracking a variable operands length instruction based on the length of its operands according to one or more embodiments of the present invention.

FIG. 15 is an operational flow diagram illustrating one example of managing variable length instructions. The operational flow diagram of FIG. 15 beings at step 1502 and flows directly into step 1504. The IDU 214, at step 1504, receives a variable operand length instruction. The IDU 214, at step 1506, analyzes the variable operand length instruction. The IDU 214, at step 1508, identifies, based on the analyzing, the instruction type of the instruction, e.g., MVC, XC, OC/NC, CLC, MP, DP, SP, AP, ZAP, CP, SRP.

The IDU 214, at step 1510, identifies, based on the analyzing, the length of the variable operand length instruction. The IDU 214, at step 1512, determines if the length satisfies a given threshold for the identified instruction type, e.g., is the length equal to 1 to 8 bytes, as discussed above with respect to FIGS. 6-14. If the result of this determination is negative, the IDU 214, at step 1514, issues the instruction as a sequenced op. The control flow then exits at step 1516. If the result of this determination is positive, the IDU 214, at step 1518, organizes the instruction into a set of unit of operations that can be executed in parallel based on the length of the instruction. This organization or cracking has been discussed above in more detail with respect to FIGS. 6-14. The IDU 214, at step 1520, executes the set of unit of operations. The control flow then exits at step 1522.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a program product via CD or DVD, e.g. CD, CD ROM, or other form of recordable media, or via any type of electronic transmission mechanism.

What is claimed is:

1. A method for managing variable operand length instructions, the method comprising:
   receiving at least one variable operand length instruction;
   analyzing the at least one variable operand length instruction;
   identifying, based on the analyzing, a length of at least one operand in the variable operand length instruction;
   organizing, during at least one of instructing decoding cycles and instruction grouping cycles, the at least one variable operand length instruction into a set of unit of operations, wherein a different organization is performed for different lengths of the at least one operand, and wherein the set of unit of operations are issuable and executable in parallel;
   sending the set of unit of operations to an instruction sequencing unit;
   issuing, by the instruction sequencing unit, the set of unit of operations to one or more execution units; and
   executing, by the one or more execution units, the set of unit of operations.

2. The method of claim 1, wherein the at least one variable operand length instruction is one of a storage-to-storage logical instruction and a storage-to-storage decimal instruction.

3. The method of claim 1, wherein organizing the at least one variable operand length instruction into a set of unit of operations comprises:
   organizing the at least one variable operand length instruction into a first unit of operation and a second unit of operation, wherein the first unit of operation fetches a given number of bytes from an operand associated with the variable operand length instruction and stores the given number of bytes into a scratch general register, and wherein the second unit of operation is issued to a load-store unit and to a fixed-point unit, and wherein the second unit of operation calculates a storage address and performs pretesting on the storage address, wherein the second unit of operation reads the given number of bytes from the scratch general register and sends the given number of bytes to a store buffer unit where data is to be stored to memory.

4. The method of claim 1, wherein organizing the at least one variable operand length instruction into a set of unit of operations comprises:

organizing the at least one variable operand length instruction into a first unit of operation, a second unit of operation, a third unit of operation, and a fourth unit of operation, wherein the first unit of operation fetches a first given number of bytes from an operand associated with the variable operand length instruction and stores the first given number of bytes into a first scratch general register, wherein the second unit of operation is issued to a load-store unit and to a fixed-point unit, and wherein the second unit of operation calculates a first storage address and performs pretesting on the first storage address, wherein the second unit of operation reads the first given number of bytes from the first scratch general register and sends the first given number of bytes to a store buffer unit, wherein the third unit of operation fetches a second given number of bytes from the operand and stores the second given number of bytes into a second scratch general register, and wherein the fourth unit of operation is issued to a load-store unit and to a fixed-point unit, and wherein the fourth unit of operation calculates a second storage address and performs pretesting on the second storage address, wherein the second unit of operation reads the second given number of bytes from the second scratch general register and sends the second given number of bytes to the store buffer unit where data is to be stored in memory.

5. The method of claim 1, wherein organizing the at least one variable operand length instruction into a set of unit of operations comprises:

organizing the at least one variable operand length instruction into a first unit of operation and a second unit of operation, wherein the first unit of operation fetches a given number of bytes from a first operand associated with the variable length instruction and stores the given number of bytes into a scratch general register, and wherein the second unit of operation is issued to a load-store unit and to a fixed-point unit, and wherein the second unit of operation calculates a storage address and performs pretesting on the storage address, wherein the second unit of operation fetches a given number of bytes from a second operand and passes the given number of bytes from the second operand to the fixed-point unit, and wherein the fixed-point unit performs an operation comprising one of an exclusive OR operation, an OR operation, and an AND operation on the given number of bytes from the scratch general register and the given number of bytes from the second operand and sets a condition code based on a result of the operation, and wherein the fixed point unit sends the result back to the load store unit to be stored in memory at a location associated with the first operand.

6. The method of claim 1, wherein organizing the at least one variable operand length instruction into a set of unit of operations comprises:

organizing the at least one variable operand length instruction into a first unit of operation and a second unit of operation, wherein the first unit of operation fetches a given number of bytes from a first operand associated with the variable operand length instruction and stores the given number of bytes into a scratch general register, and wherein the second unit of operation is issued to a load-store unit and to a fixed-point unit, and wherein the second unit of operation calculates a storage address and performs pretesting on the storage address, wherein the second unit of operation fetches a given number of bytes from a second operand and passes the given number of bytes from the second operand to the fixed-point unit, and wherein the fixed-point unit compares the given number of bytes from the scratch general register and the given number of bytes from the second operand and sets a condition code based thereon.

7. The method of claim 1, wherein organizing the at least one variable operand length instruction into a set of unit of operations comprises:

organizing the at least one variable operand length instruction into at a first unit of operation, a second unit of operation, a third unit of operation, and a fourth unit of operation, wherein the first unit of operation fetches a given number of bytes from a first operand associated with the variable length instruction and stores the given number of bytes into a first scratch register, wherein the second unit of operation fetches a given number of bytes from a second operand associated with the variable operand length instruction and stores the given number of bytes into a second scratch register, wherein the third unit of operation is executed in the decimal point floating unit and performs a decimal point unit operation on the given number of bytes in the first scratch register and the given number of bytes in the second scratch register and stores a resultant dataset in the first scratch register, and wherein the fourth unit of operation reads the first scratch register and sends the resultant dataset to memory to be stored at location associated with the first operand.

8. The method of claim 1, wherein organizing the at least one variable operand length instruction into a set of unit of operations comprises:

organizing the at least one variable operand length instruction into at least a first unit of operation, a second unit of operation, a third unit of operation, a fourth operation, a fifth unit of operation, and a sixth unit of operation, wherein the first unit of operation fetches a first given number of bytes from a first operand associated with the variable length instruction and stores the first given number of bytes into a first scratch register, wherein the second unit of operation fetches a second given number of bytes from the first operand and stores the second given number of bytes into a second scratch register, wherein the third unit of operation fetches a given number of bytes from a second operand associated with the variable operand length instruction and stores the given number of bytes into a third scratch register, wherein the fourth unit of operation is executed in the decimal point floating unit and performs a decimal point unit operation on the given number of bytes in the first and second scratch registers and the given number of bytes in the third scratch register, wherein the fifth unit of operation sends a first resultant dataset from the decimal point unit of operation to memory to be stored at a location associated with the first operand, and wherein the sixth unit of operation sends a second resultant dataset from the decimal point unit of operation to memory to be stored at a location associated with the first operand.

9. The method of claim 1, wherein organizing the at least one variable operand length instruction into a set of unit of operations comprises:

organizing the at least one variable operand length instruction into at least a first unit of operation, a second unit of operation, a third unit of operation, a fourth unit of operation, and a fifth unit of operand, wherein the first unit of operation fetches a given number of bytes from a first operand associated with the variable length instruction and stores the given number of bytes into a first scratch register, wherein the second unit of operation fetches a first given number of bytes from a second operand associated with the variable length instruction and stores the first given number of bytes into a second scratch register, wherein the third unit of operation fetches a second given number of bytes from the second operand and stores the second given number of bytes into a third scratch register, wherein the fourth unit of operation is executed in the decimal point floating unit and performs a decimal point unit operation on the given number of bytes in the first scratch register and the first and second given number of bytes in the second and third registers and saves a resultant dataset back in the first scratch register, and wherein the fifth unit of operation reads a resultant dataset of the decimal point operation from the first scratch register and sends the resultant dataset of memory to be saved at a location associated with the first operand.

10. The method of claim 1, wherein organizing the at least one variable operand length instruction into a set of unit of operations comprises:

organizing the at least one variable operand length instruction into at least a first unit of operation, a second unit of operation, a third unit of operation, a fourth unit of operation, a fifth unit of operation, a sixth unit of operation, and a seventh unit of operation, wherein the first unit of operation fetches a first given number of bytes from a first operand associated with the variable operand length instruction and stores the first given number of bytes into a first scratch register, wherein the second unit of operation fetches a second given number of bytes from the first operand and stores the second given number of bytes into a second scratch register, wherein the third unit of operation fetches a first given number of bytes from a second operand associated with the variable operands length instruction and stores the first given number of bytes into a third scratch register, wherein the fourth unit of operation fetches a second given number of bytes from the second operand and stores the second given number of bytes into a fourth scratch register, wherein the fifth unit of operation is executed in the decimal point floating unit and performs a decimal point unit operation on the given number of bytes in the first and second scratch registers and the given number of bytes in the third and fourth registers, wherein the sixth unit of operation sends a first resultant dataset from the decimal point unit of operation to memory to be stored at a location associated with the first operand, and wherein the seventh unit of operation sends a second resultant dataset from the decimal point unit of operation to memory to be stored at a location associated with the first operand.

11. An information processing system for managing variable operand length instructions, the information processing system comprising:

a memory;

a processor communicatively coupled to the memory, wherein the processor comprises at least a cracking unit, an instruction decoding unit, an instruction sequencing unit, and one or more execution units, wherein the cracking unit is configured to perform a method comprising:

receiving at least one variable operand length instruction;

analyzing the at least one variable operand length instruction;

identifying, based on the analyzing, a length of at least one operand in the variable operand length instruction; and determining, based on the identifying, if the length of the at least one operand satisfies a threshold;

based on the length of the at least one operand satisfying the threshold, the method further comprises;

organizing, during at least one of instructing decoding cycles and instruction grouping cycles, the at least one variable operand length instruction into a set of unit of operations, wherein a different organization is performed for different lengths of the at least one operand, and wherein the set of unit of operations are issuable and executable in parallel;

wherein the instruction decoding unit is configured to perform a method comprising:

sending the set of unit of operations to the instruction sequencing unit based on the length of the at least one operand satisfying the threshold; and sending the least one variable operand length instruction to the instruction sequencing unit based on the length of the at least one operand failing to satisfy the threshold;

wherein the instruction sequencing unit is configured to perform a method comprising:

issuing the set of unit of operations to the one or more execution units based on the length of the at least one operand satisfying the threshold; and issuing the least one variable operand length instruction to the one or more execution units as a sequenced instruction based on the length of the at least one operand failing to satisfy the threshold; and wherein the one or more execution units are configured to perform a method comprising:

executing the set of unit of operations based on the length of the at least one operand satisfying the threshold; and executing the sequenced instruction based on the length of the at least one operand failing to satisfy the threshold.

12. The information processing system of claim 11, wherein organizing the at least one variable operand length instruction into a set of unit of operations comprises:

organizing the at least one variable operand length instruction into a first unit of operation and a second unit of operation, wherein the first unit of operation fetches a given number of bytes from an operand associated with the variable operand length instruction and stores the given number of bytes into a scratch general register, and wherein the second unit of operation is issued to a load-store unit and to a fixed-point unit, and wherein the second unit of operation calculates a storage address and performs pretesting on the storage address, wherein the second unit of operation reads the given number of bytes from the scratch general register and sends the given number of bytes to a store buffer unit where data is to be stored to memory.

13. The information processing system of claim 11, wherein organizing the at least one variable operand length instruction into a set of unit of operations comprises:

organizing the at least one variable operand length instruction into a first unit of operation, a second unit of operation, a third unit of operation, and a fourth unit of operation, wherein the first unit of operation fetches a first given number of bytes from an operand associated with the variable operand length instruction and stores the first given number of bytes into a first scratch general register, wherein the second unit of operation is issued to a load-store unit and to a fixed-point unit, and wherein the second unit of operation calculates a first storage address and performs pretesting on the first storage address, wherein the second unit of operation reads the first given number of bytes from the first scratch general register and sends the first given number of bytes to a store buffer unit, wherein the third unit of operation fetches a second given number of bytes from the operand and stores the second given number of bytes into a second scratch general register, and wherein the fourth unit of operation is issued to a load-store unit and to a fixed-point unit, and wherein the fourth unit of operation calculates a second storage address and performs pretesting on the second storage address, wherein the second unit of operation reads the second given number of bytes from the second scratch general register and sends the second given number of bytes to the store buffer unit where data is to be stored in memory.

14. The information processing system of claim 11, wherein organizing the at least one variable operand length instruction into a set of unit of operations comprises:

organizing the at least one variable operand length instruction into a first unit of operation and a second unit of operation, wherein the first unit of operation fetches a given number of bytes from a first operand associated with the variable length instruction and stores the given number of bytes into a scratch general register, and wherein the second unit of operation is issued to a load-store unit and to a fixed-point unit, and wherein the second unit of operation calculates a storage address and performs pretesting on the storage address, wherein the second unit of operation fetches a given number of bytes from a second operand and passes the given number of bytes from the second operand to the fixed-point unit, and wherein the fixed-point unit performs an operation comprising one of an exclusive OR operation, an OR operation, and an AND operation on the given number of bytes from the scratch general register and the given number of bytes from the second operand and sets a condition code based on a result of the operation, and wherein the fixed point unit sends the result back to the load store unit to be stored in memory at a location associated with the first operand.

15. The information processing system of claim 11, wherein organizing the at least one variable operand length instruction into a set of unit of operations comprises:

organizing the at least one variable operand length instruction into a first unit of operation and a second unit of operation, wherein the first unit of operation fetches a given number of bytes from a first operand associated with the variable operand length instruction and stores the given number of bytes into a scratch general register, and wherein the second unit of operation is issued to a load-store unit and to a fixed-point unit, and wherein the second unit of operation calculates a storage address and performs pretesting on the storage address, wherein the second unit of operation fetches a given number of bytes from a second operand and passes the given number of bytes from the second operand to the fixed-point unit, and wherein the fixed-point unit compares the given number of bytes from the scratch general register and the given number of bytes from the second operand and sets a condition code based thereon.

16. A computer program product for managing variable operand length instructions, the computer program product comprising:

a storage medium readable by a processing circuit and storing instructions for execution by the processing circuit for performing a method comprising:

receiving at least one variable operand length instruction;

analyzing the at least one variable operand length instruction;

identifying, based on the analyzing, a length of at least one operand in the variable operand length instruction;

organizing, during at least one of instructing decoding cycles and instruction grouping cycles, the at least one variable operand length instruction into a set of unit of operations, wherein a different organization is performed for different lengths of the at least one operand, and wherein the set of unit of operations are issuable and executable in parallel;

sending the set of unit of operations to an instruction sequencing unit;

issuing, by the instruction sequencing unit, the set of unit of operations to one or more execution units; and executing, by the one or more execution units, the set of unit of operations.

17. The computer program product of claim 16, wherein organizing the at least one variable operand length instruction into a set of unit of operations comprises:

organizing the at least one variable operand length instruction into a first unit of operation, a second unit of operation, a third unit of operation, and a fourth unit of operation, wherein the first unit of operation fetches a first given number of bytes from an operand associated with the variable operand length instruction and stores the first given number of bytes into a first scratch general register, wherein the second unit of operation is issued to a load-store unit and to a fixed-point unit, and wherein the second unit of operation calculates a first storage address and performs pretesting on the first storage address, wherein the second unit of operation reads the first given number of bytes from the first scratch general register and sends the first given number of bytes to a store buffer unit, wherein the third unit of operation fetches a second given number of bytes from the operand and stores the second given number of bytes into a second scratch general register, and wherein the fourth unit of operation is issued to a load-store unit and to a fixed-point unit, and wherein the fourth unit of operation calculates a second storage address and performs pretesting on the second storage address, wherein the second unit of operation reads the second given number of bytes from the second scratch general register and sends the second given number of bytes to the store buffer unit where data is to be stored in memory.

18. The computer program product of claim 16, wherein organizing the at least one variable operand length instruction into a set of unit of operations comprises:

organizing the at least one variable operand length instruction into a first unit of operation and a second unit of operation, wherein the first unit of operation fetches a given number of bytes from a first operand associated with the variable length instruction and stores the given number of bytes into a scratch general register, and wherein the second unit of operation is issued to a load-store unit and to a fixed-point unit, and wherein the second unit of operation calculates a storage address and performs pretesting on the storage address, wherein the second unit of operation fetches a given number of bytes from a second operand and passes the given number of bytes from the second operand to the fixed-point unit, and wherein the fixed-point unit performs an operation comprising one of an exclusive OR operation, an OR operation, and an AND operation on the given number of bytes from the scratch general register and the given number of bytes from the second operand and sets a condition code based on a result of the operation, and wherein the fixed point unit sends the result back to the load store unit to be stored in memory at a location associated with the first operand.

19. The computer program product of claim 16, wherein organizing the at least one variable operand length instruction into a set of unit of operations comprises:

organizing the at least one variable operand length instruction into a first unit of operation and a second unit of operation, wherein the first unit of operation fetches a given number of bytes from a first operand associated with the variable operand length instruction and stores the given number of bytes into a scratch general register, and wherein the second unit of operation is issued to a load-store unit and to a fixed-point unit, and wherein the second unit of operation calculates a storage address and performs pretesting on the storage address, wherein the second unit of operation fetches a given number of bytes from a second operand and passes the given number of bytes from the second operand to the fixed-point unit, and wherein the fixed-point unit compares the given number of bytes from the scratch general register and the given number of bytes from the second operand and sets a condition code based thereon.

20. The computer program product of claim 16, wherein organizing the at least one variable operand length instruction into a set of unit of operations comprises:

organizing the at least one variable operand length instruction into a first unit of operation and a second unit of operation, wherein the first unit of operation fetches a given number of bytes from an operand associated with the variable operand length instruction and stores the given number of bytes into a scratch general register, and wherein the second unit of operation is issued to a load-store unit and to a fixed-point unit, and wherein the second unit of operation calculates a storage address and performs pretesting on the storage address, wherein the second unit of operation reads the given number of bytes from the scratch general register and sends the given number of bytes to a store buffer unit.

* * * * *